May 23, 1950

E. W. HART 2,508,386

QUADRANTAL CORRECTOR FOR MAGNETIC COMPASSES

Filed May 5, 1945

INVENTOR.
EDWARD W. HART
BY
Ralph W. Chappell
ATTORNEY.

Patented May 23, 1950

2,508,386

UNITED STATES PATENT OFFICE 2,508,386

QUADRANTAL CORRECTOR FOR MAGNETIC COMPASSES

Edward W. Hart, San Diego, Calif.

Application May 5, 1945, Serial No. 592,151

6 Claims. (Cl. 33—224)

(Granted under the act of March 3, 1883, as amended April 30, 1928; 370 O. G. 757)

This invention relates to improved quadrantal correctors for a magnetic compass.

A magnetic compass used on board ship is subject to error, called "deviation," due to the presence of magnetic forces in the ship. Such magnetic forces are caused principally by permanent or sub-permanent magnetism in the steel or hard iron of the ship and magnetism induced in the soft iron of the ship by the magnetic field of the earth. In practice, these forces are compensated so that the deviation is reduced to a minimum and the compass needle points as nearly as possible to the magnetic pole of the earth.

Certain of the magnetic forces present produce a deviation which is semi-circular in character; that is, there are two headings of the ship in which the deviation caused by such forces reaches a maximum. Other magnetic forces present produce a deviation which is quadrantal in character; that is, there are four headings in which the deviation reaches a maximum. Still other forces produce deviations of higher orders such as sextantal or decantal.

The present invention relates to improved correctors for quadrantal deviation. When quadrantal correctors of my invention are employed, semi-circular deviation may be compensated by means known in the art. Deviations of higher orders may be ignored, but preferably the sextantal and decantal deviations are substantially eliminated by the use of a compass embodying the novel features described and claimed in my co-pending application Serial No. 591,770, Navy Case No. 5249, issued on March 16, 1948, as Patent Number 2,437,692 and filed co-incidentally with this application, entitled "Magnetic compass."

Quadrantal deviation is caused principally by the horizontal component of induced magnetism in the soft iron of the ship and is compensated by the use of correctors of soft ferrous material mounted at each side of the compass. Ordinarily one such corrector is secured to the compass binnacle at each side thereof parallel to the athwartships line of the ship. Magnetic poles are induced in the correctors by the combined effects of the magnetic fields of the earth and of the ship. When the correctors are placed the appropriate lateral distance from the compass needle, the poles induced in the correctors substantially compensate the quadrantal deviation.

Heretofore the quadrantal correctors employed have been of spherical shape. The spherical correctors are satisfactory so long as the ship remains in substantially the same latitude. However, any significant change of latitude necessitates an adjustment in the distance between the correctors and the compass. Such adjustment is made necessary by the fact that the horizontal components of the magnetic fields of the earth and the ship are not the only fields that act on the correctors. The correctors are further magnetized by the influence of the compass needle. The effect of this influence is to increase the compensating effect of the correctors, but by a different amount in each latitude when spherical correctors are employed.

I have found that the use of quadrantal correctors designed in accordance with the principles set forth hereinafter eliminates the need for adjusting the distance between the correctors and the compass when there is a change of latitude.

It is the principal object of this invention to provide quadrantal correctors for a magnetic compass that have the same compensating effect on the compass in all latitudes and thereby eliminate the need for adjustment in the distance between the compass and correctors with change of latitude.

It is a further object of my invention to provide for carrying out the foregoing object in a facile, economical and efficient manner.

In accomplishing these and other objects of the present invention, I have provided improved details of structure, preferred forms of which are illustrated in the accompanying drawing, wherein.

Figure 1:
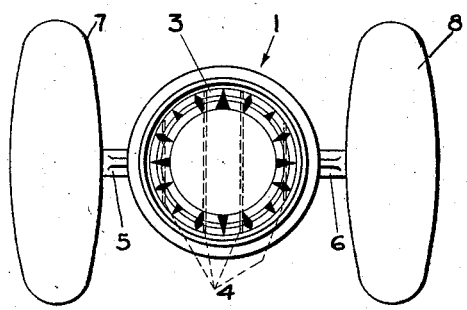
Fig. 1 is a top plan view of a magnetic compass with quadrantal correctors of my invention applied thereto. This top plan view is applicable to either of the two species of my invention illustrated in Figs. 2 and 3, respectively.

Referring more in detail to the drawings:

There is shown at 1 a magnetic compass which may be of any design suitable for use on board ship. As here shown, the compass is supported in a binnacle 2 in the upper portion of which is provided a compass bowl for receiving a fluid on which is floated the compass card 3. The latter is preferably graduated through 360° to indicate a ship's heading at any time. One or more compass needles 4 are secured to the underface of the card 3. The needles 4 are magnetized and hence their north seeking poles tend to point toward the north magnetic pole of the earth, except that some deviation occurs due to the magnetic forces present in the ship.

Semi-circular deviation in the compass is compensated by means known in the art and not shown herein.

A pair of brackets 5 and 6 are secured to the binnacle 2 on opposite sides thereof, usually parallel to the athwarpships line of the compass, to support the quadrantal correctors 7 and 8 of my invention. The brackets 5 and 6 are slotted and the correctors have depending studs 9 and 10 adapted to pass through the slots and thereby secure the correctors to the brackets in such manner that the correctors may be adjusted laterally with respect to the compass needles. The correctors are held in adjusted position by tightening the nuts 11 and 12 on the studs 9 and 10.

The correctors 7 and 8 are made of a soft ferrous material that easily acquires magnetism by induction when placed in a magnetic field, but that quickly loses its magnetism when removed from the field. Preferably the correctors 7 and 8 are hollow and substantially identical to each other.

In the foregoing respects the correctors of my invention are substantially similar to the spherical correctors heretofore used for compensating quadrantal deviation. It will be noted, however, that the correctors 7 and 8 are shaped as prolate spheroids or ellipsoids of revolution, rather than as spheres and that their elongated axes are substantially parallel to the fore and aft line of the compass. In other words, it might be said that the elongated axes lie in a plane which is normally horizontal when the ship carrying the compass is on an even keel. Under these circumstances, the axis of the ellipsoids parallel to the axis of rotation of the compass card may be said to be normally vertical. The use of quadrantal correctors of this type, with the ratio of axial lengths predetermined in accordance with certain principles, eliminates the need for adjusting the distance between the correctors and the compass needle with changes of latitude, as I will hereinafter demonstrate.

Figure 2:
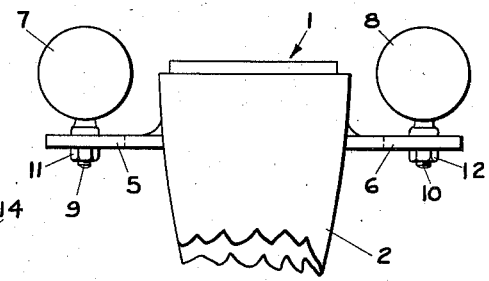
Fig. 2 is an end elevational view of a magnetic compass with quadrantal correctors embodying a first form of my invention applied thereto.
Figure 3:
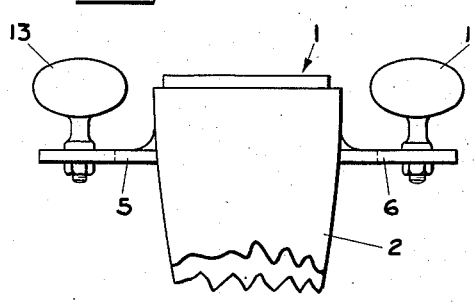
Fig. 3 is an end elevational view of a magnetic compass with quadrantal correctors of a modified form of my invention applied thereto.

In the modified form of my invention shown in Fig. 3 the correctors 13 and 14 are shaped as ellipsoids in which all three axes are of unequal length. Otherwise the structure involved is similar to that shown in Figs. 1 and 2. I have found that correctors of this shape also eliminate the need for adjustment with change of latitude.

Operation

The quadrantal deviation may be expressed as the sum of two terms, one of which is proportional to the sine of twice the ship's heading by magnetic compass and the other of which is proportional to the cosine of twice the ship's heading by magnetic compass. Usually the quadrantal deviation is a maximum at the intercardinal points of magnetic compass heading (i. e. NE, SE, SW, NW) and in such case the quadrantal deviation is proportional only to the sine of the ship's heading.

When the ship is on any heading in which there would be quadrantal deviation, the magnetic poles induced in the quadrantal correctors by the combined fields of the earth and the ship tend to compensate this deviation, provided the correctors are adjusted to the proper distance from the compass needle. The field of the earth tends to induce a north seeking pole in the corrector at the point of the corrector directed toward the north magnetic pole of the earth and a south seeking pole at the opposite point of the corrector. The location of the poles on the correctors is modified somewhat by the effect of the magnetic field of the ship, but such modification is not substantially affected by latitude. When the correctors are adjusted to the proper distance from the compass, as determined experimentally, the induced field therearound balances the induced field in the ship that causes quadrantal deviation.

The spherical quadrantal correctors heretofore used would compensate quadrantal deviation in all latitudes with a single setting if the only magnetic fields acting on them were the horizontal fields of the earth and of the ship. However, such is not the case. Because of the proximity of the correctors to the magnetic compass, the correctors are further magnetized by the compass needles, and this magnetization modifies the compensating effect of the correctors. The compensating effect is increased by this additional magnetization, but, when spherical correctors are employed, the increased compensating effect varies with latitude. This fact makes it necessary to adjust the distance between the spherical correctors and the compass with each significant change of latitude.

I shall demonstrate mathematically that the use of quadrantal correctors of ellipsoidal shape having the proper ratio of axes lengths eliminates the need for such adjustment with change of latitude.

To simplify the preliminary analysis, certain assumptions are necessary. The compass is assumed to be a magnetic dipole (i. e. a north seeking pole and a south seeking pole separated by an infinitesimal distance) located at the center of the actual compass, as represented at $0$, Fig. 4. The field produced by the compass at the correctors is assumed to be uniform over the volume of the corrector and equal in magnitude to the strength of the field at the center of the corrector. These assumptions conform with the conventional treatment of compass deviations and are justifiable for initial approximation. Lastly, it is assumed that all semi-circular deviation and deviation of higher orders are eliminated.

Figure 4:
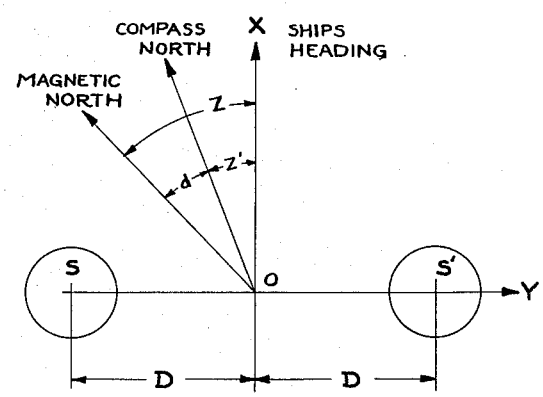
Fig. 4 is a schematic view of a theoretical magnetic dipole compass and quadrantal correctors showing the directions of certain of the forces involved.

Referring principally to Fig. 4, the X axis is the heading of the ship on a magnetic azimuth Z. A magnetic dipole compass, having magnetic moment M, is located at $0$ and directed toward compass north which differs from magnetic north by the angle of deviation $d$. The ship's heading thus has a compass azimuth of $Z'$. The horizontal component of the earth's magnetic field H is directed toward magnetic north. Also present are the fields produced by the ship's parameters, the longitudinal parameter being represented by $a$, and the athwartship parameter by $e$. The fields produced thereby are equal to $aH \cos Z$ in the X direction and $-eH \sin Z$ in the Y direction. The correctors S and S' are each located a distance D from the compass $0$. The magnetic moment of each corrector S and S' is denoted $m$. The magnetization co-efficient (i. e. the co-efficient by which the applied field at the corrector must be multiplied to yield the magnetic moment $m$) is denoted K. Any quantity to which a subscript $x$ or $y$ is appended denotes respectively the X or Y component of that quantity.

Considering first the effect on the correctors produced by the ship's parameters $a$ and $e$:

1 (a) $\quad m_x = K_x\left[(1+a)H\cos Z - \dfrac{M}{D^3}\cos Z'\right]$ (b) $\quad m_y = -K_y\left[(1+e)H\sin Z + 2\dfrac{M}{D^3}\sin Z'\right]$ Considering next the X and Y components of the field produced at the compass by the magnetic moment of the two spheres:

2 (a)

$H_x'' = -2\dfrac{m_x}{D^3} = -2K_x\left[\dfrac{1+a}{D^3}H\cos Z - \dfrac{M}{D^6}\cos Z'\right]$ (b)

Figure 5:
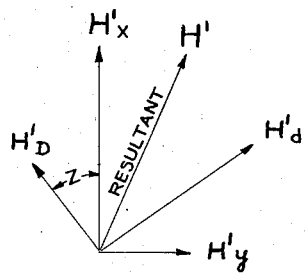
Fig. 5 is a diagrammatic view further illustrating certain of the forces that are considered.

$H_y'' = 4\dfrac{m_y}{D^3} = -4K_y\left[\dfrac{1+e}{D^3}H\sin Z + 2\dfrac{M}{D^6}\sin Z'\right]$ Increasing these fields by the amount of the ship's field due to $a$ and $e$ to give the sum of ship and corrector field at 0:

3 (a) $\quad H_x' = \left[a - 2\dfrac{1+a}{D^3}K_x\right]H\cos Z + 2\dfrac{M}{D^6}K_x\cos Z'$ (b) $\quad H_y' = -\left[e + 4\dfrac{1+e}{D^3}K_y\right]H\sin Z - 8\dfrac{M}{D^6}K_y\sin Z'$ Let $H_d'$ be the component of the resultant $H'$ of $H_x'$ and $H_y'$ perpendicular to $H$, and $H_D'$ be the component parallel to $H$ as shown in Fig. 5. These are respectively the deviational component and the directive component.

4 $\quad$ (a) $H_d' = H_x'\sin Z + H_y'\cos Z$
$\quad\quad$ (b) $H_D' = H_x'\cos Z - H_y'\sin Z$ Substituting Equations 3 in Equations 4:

5 (a) $H_d' = \left[\dfrac{a-e}{2} - 2\dfrac{1+e}{D^3}K_y - \dfrac{1+a}{D^3}K_x\right]H\sin 2Z +$ $\quad\quad 2\dfrac{MK_x}{D^6}\sin Z\cos Z' - 8\dfrac{MK_y}{D^6}\sin Z'\cos Z$ (b) $H_D' = \left[\dfrac{a+e}{2} + 2\dfrac{1+e}{D^3}K_y - \dfrac{1+a}{D^3}K_x\right]H +$ $\quad\quad \left[\dfrac{a-e}{2} - 2\dfrac{1+e}{D^3}K_y - \dfrac{1+a}{D^3}K_x\right]H\cos 2Z +$ $\quad\quad 2\dfrac{MK_x}{D^6}\cos Z\cos Z' + 8\dfrac{MK_y}{D^6}\sin Z\sin Z'$ If $d$ is to be zero, $H_d'$ must be zero and the conditions for correction may be written as follows:

6 $\quad 0 = \left[\dfrac{a-e}{2} - 2\dfrac{1+e}{D^3}K_y - \dfrac{1+a}{D^3}K_x\right]H - \dfrac{M}{D^6}(4K_y - K_x)$ If the quadrantal correctors are solid spheres:

$$K_x = K_y = \dfrac{\mu-1}{\mu+2}R^3$$

where $R$ is the radius of the sphere and Equation 6 reduces to:

7 $\quad 0 = \left[\dfrac{a-e}{2} - \dfrac{\mu-1}{\mu+2}\dfrac{R^3}{D^3}(3+2e+a)\right]H - 3M\dfrac{R^3}{D^6}\dfrac{\mu-1}{\mu+2}$ Obviously the adjustment is dependent on the value of H at which it is accomplished. However, if $K_x$ could be made equal to $4K_y$ this could be voided. Since $K_x$ and $K_y$ are functions of the characteristics (the geometry, inter alia), of the correctors, it becomes apparent that $K_x$ can conceivably be made equal to $4K_y$ by judicious choice of characteristics, including geometry, for the correctors. In other words, the quadrantal correctors should assume a different shape, preferably that of a prolate spheroid, with the focal axis parallel to the X-axis.

To determine the dimensions of the solid spheroid recall that the components of K are defined by the equations $$m_x = K_x h_x$$

and $$m_y = K_y h_y$$

where $h$ is any applied magnetic field. To discover the characteristics of the correctors which determine the magnitudes of $K_x$ and $K_y$ consider the following analysis based on material available in standard texts on magnetism. (See, for example, "Electricity and Magnetism" by S. G. Starling, published by Longmans, Green and Co., Ltd., 1934, pp. 266–270.)

Let $f$ = the demagnetizing field inside the spheroid due to its magnetization
$h'$ = the resultant magnetic field inside the spheroid
$I$ = the intensity of magnetization of the spheroid (i. e. the magnetic moment per unit volume)
$V$ = the volume of the spheroid
$N_x$ = the demagnetizing factor in the X direction
$N_y$ = the demagnetizing factor in the Y direction
$\mu$ = the magnetic permeability of the spheroid
$\epsilon$ = the magnetic susceptibility of the spheroid This treatment, while indicated for the X component, holds as well for the other components.

$$f_x = N_x I_x$$
$$h_x' = h_x - f_x$$
$$h_x' = h_x - N_x I_x$$
$$I_x = \epsilon h_x'$$
$$I_x = \epsilon(h_x - N_x I_x)$$
$$I_x = \dfrac{\epsilon h_x}{1+\epsilon N_x}$$
$$m_x = I_x V = \dfrac{\epsilon}{1+\epsilon N_x}V h_x$$

As noted hereinbefore, this relation defines $K_x$, whence $$K_x = \dfrac{\epsilon}{1+\epsilon N_x}V$$

$$\epsilon = \dfrac{\mu-1}{4\pi}$$

A $\quad K_x = \dfrac{\mu-1}{4\pi+(\mu-1)N_x}V$

B $\quad K_y = \dfrac{\mu-1}{4\pi+(\mu-1)N_y}V$

Now as stated above, if the characteristics of the spheroid are such that $K_x = 4K_y$, the last term of Equation 6 will be zero and an adjustment which is accomplished for one value of H will hold good for any H and therefore for any latitude. $K_x$ will equal $4K_y$ if C $\quad 4\pi+N_y(\mu-1) = 4[4\pi+N_x(\mu-1)]$ from A and B. $N_x$ and $N_y$ are well known functions of only the geometric dimensions of the spheroid, in particular of the dimension ratio, i. e. the ratio of the semi-major axis $c$ to either semi-minor axis $b$.

Specifically

D $\qquad N_x = 4\pi\left(\frac{1}{e^2}-1\right)\left(\frac{1}{2e}\ln\frac{1+e}{1-e}-1\right)$ and E $\qquad N_x + 2N_y = 4\pi$ as is apparent from "A Treatise on Electricity and Magnetism" by James Clerk Maxwell, Oxford 1892, Vol. II., p. 69, Equations 13 and 14, where $$e^2 = 1 - \left(\frac{b}{c}\right)^2$$

or

F $\qquad \frac{c}{b} = \frac{1}{\sqrt{1-e^2}}$

Combining E with C,

G $\qquad N_x = 4\pi\left[\frac{1}{9} - \frac{2}{3(\mu-1)}\right]$

Simultaneous solution of G and D (substitution in F) yields a unique value for the dimension ratio, $$\frac{c}{b}$$

Since $\mu$ is in practice sufficiently large so that the term $$\frac{2}{3(\mu-1)}$$

in G can be neglected compared to $$\frac{1}{9}$$

$N_x$ can be taken to be $$\frac{4\pi}{9}$$

and the numerical value of the dimension ratio is then found to be equal to three to a sufficient accuracy.

The normal compensating effect of the two types of correctors can be compared as follows:
For the sphere $$K_x = K_y = \frac{3}{4\pi}\frac{\mu-1}{\mu+2}V_s$$

For the spheroid $$K_x = \frac{3}{4\pi}\cdot 3 \cdot \frac{\mu-1}{\mu+2}V_E$$

$$K_y = \frac{3}{4\pi}\cdot\frac{3}{4}\cdot\frac{\mu-1}{\mu+2}V_E$$

If these values of $K_x$ and $K_y$ are substituted in the co-efficient of H in Equation 6, the following conditions for correction are obtained, ignoring the induction term for the spheres.

8 (a) $\qquad 0 = \frac{a-e}{2} - (3+2e+a)\frac{3}{4\pi}\frac{\mu-1}{\mu+2}\frac{V_s}{D^3}$ (b) $\qquad 0 = \frac{a-e}{2} - (3+e+2a)\frac{3}{4\pi}\cdot\frac{3}{2}\cdot\frac{\mu-1}{\mu+2}\frac{V_E}{D^3}$ Equations 8 show that only about ⅔ of the amount of iron employed in the spheres are necessary for equivalent correction by the spheroid. However, since in practice part of the compensating effect of the spheres is the induction effect, it is likely that the mass of iron used in the sphere would be just about sufficient to make a spheroid of the proposed type.

The next step is to make the analysis more rigorous by testing the effect of the assumption that the field produced at the correctors is uniform at the corrector and that the field produced by the corrector is that of a dipole located at the center of the corrector.

The result of the induction effect can be obtained by an analysis involving only the magnetic moment of the compass and the presence of the correctors, ignoring the effect of the ship's and earth's fields. In other words, the forces produced on a compass (or magnetic dipole as we shall consider it) are considered by the magnetization they produce in a neighboring piece of iron.

By expansion in spherical harmonics the fields, $H_x'$ and $H_y'$, produced at the compass due to its magnetization of the spheres are as follows:

9(a)
$$H_x' = \frac{M}{D^3}\cos Z' \sum_{n=1}^{\infty}\left[\frac{dP_n}{dx}\right]_{x=1}\frac{n(\mu-1)}{1+n(\mu+1)}\left(\frac{R}{D}\right)^{2n+1}$$
$$= \frac{M}{D^3}\cos Z'\left\{\frac{\mu-1}{\mu+2}\left(\frac{R}{D}\right)^3 + \frac{6(\mu-1)}{2\mu+3}\left(\frac{R}{D}\right)^5 + \cdots\right\}$$

(b)
$$H_y' = -\frac{M}{D^3}\sin Z'\sum_{n=1}^{\infty}\frac{n(n+1)^2(\mu-1)}{1+n(\mu+1)}[P_n]_{x=1}\left(\frac{R}{D}\right)^{2n+1}$$
$$= -\frac{M}{D^3}\sin Z'\left\{\frac{4(\mu-1)}{\mu+2}\left(\frac{R}{D}\right)^3 + \frac{18(\mu-1)}{2\mu+3}\left(\frac{R}{D}\right)^5 + \cdots\right\}$$

Doubling these expressions because of the use of two correctors and substituting in Equation 4(a) it is readily seen that there is agreement with the last two terms of the right hand member of Equation 5(a) with the addition of more terms. In the case of complete correction, $Z$ equals $Z'$ and the induction field is seen to be $$-\frac{M}{D^3}\sin 2Z\left\{\frac{3(\mu-1)}{\mu+2}\left(\frac{R}{D}\right)^3 + \frac{12(\mu-1)}{2\mu+3}\left(\frac{R}{D}\right)^5 + \cdots\right\}$$

It is easily seen that as $R/D$ becomes large when spheres are close to the compass, this field becomes very large.

Considering next the effect produced by a solid prolate spheroid as expressed in prolate spheroidal harmonics, but omitting the development:

$$H_d' = \frac{M}{r_0^2 C^2}\sin 2Z'\sum_{m=0}^{\infty}\sum_{n=m}^{\infty}A_{mn}M_{mn}$$
$$\{[T_n'^m Q_n^m(r_0)]^2 - (r_0^2-1)[T_n^m Q_n'^m(r_0)^2]\}$$

where the T's are the Associated Legendre functions of the first kind evaluated at zero, and the Q's are the Associated Legendre functions of the second kind, $r_0$ is the prolate spheroidal coordinate of the position of the compass with origin at the spheroid, $r_1$ is the surface of the spheroidal corrector, and primes within brackets denote derivatives.

Further $$A_{0n} = 2n+1$$

$$A_{mn} = 2(2n+1)(-1)^m\left\{\frac{(n-m)!}{(n+m)!}\right\}^2 \text{ for } m>0$$

$$M_{mn} = -\frac{(\mu-1)P_n^m(r_1)P_n'^m(r_1)}{(\mu-1)P_n'^m(r_1)Q_n^m(r_1) + \frac{(-1)^n(n+m)!}{(r_1^2-1)(n-m)!}}$$

The condition for no induction effect is

10
$$0 = \sum_{m=0}^{\infty}\sum_{n=m}^{\infty}A_{mn}M_{mn}\{[T_n'^m Q_n^m]^2 - (r_0^2-1)[T_n^m Q_x'^m]^2\}$$

The solution of this equation gives $r_1$, which determines the dimension ratio of the spheroid, in terms of $r_0$ and $c$, the focal length. Although this equation shows that ideally a different dimension ratio is required for each distance of the corrector from the compass, the use of one dimension ratio at different distances produces an induction effect much smaller than the spheres and which may be considered negligible.

Equation 10 can be solved mathematically only with great difficulty. The most practical solution is by empirical means.

The empirical solution may be accomplished by obtaining the deviations produced by a set of spheroids of the same distance between foci but of different dimension ratios at a stated distance from the type of compass for which the correctors are to be used for different values of control field, H, corresponding to earth's field. The field H may be created artificially by the use of a set of coils which produce a reasonably uniform field over the region occupied by the compass and the correctors. The change of deviation produced by the correctors for an increment of the control field may be plotted on a graph against the corresponding dimension ratio. The dimension ratio determined by the point of the curve for which the change of deviation is zero is the desired dimension ratio for the type of compass, the size of spheroid, and distance from the compass. This procedure may be repeated for different distances of the correctors and for sets of correctors of different focal lengths. The data so obtained for any one type of compass constitutes the complete design data for that type of compass.

The value of dimension ratio will in all cases be very close to the value of three as determined hereinbefore by approximate computation.

Ideally, a different shape or dimension ratio would be required for each distance at which the corrector was set on the bracket, but the actual difference for the normal range of a few inches which adjustment might require would be negligible in terms of actual deviation.

Substantially the same form of empirical treatment as outlined above may be applied to a determination of the correct dimensions of a modified form of this corrector in the form of an ellipsoid of the type shown in Fig. 3 all of whose axes are unequal in length.

While I have shown but certain embodiments of my invention, it is apparent that the device is susceptible to further modification without departing from the spirit of the invention. I do not wish, therefore, to be limited by the disclosures set forth, but only by the scope of the appended claims.

The invention described herein may be manufactured and used by or for the Government of the United States of America for governmental purposes without the payment of any royalties thereon or therefor.

I claim:

1. A corrector for quadrantal deviation in a magnetic compass comprising a mass of relatively soft ferrous material in the shape of a prolate spheroid in which the ratio of the length of the longer axis to the length of the shorter axes is approximately 3 to 1, the long axis of the spheroid being perpendicular to a plane defined by the center of the spheroid and the normally vertical axis of the compass.

2. A corrector for quadrantal deviation in a magnetic compass comprising a mass of relatively soft ferrous material in the shape of a prolate spheroid, the center of the spheroid lying on a line perpendicular to the axis of rotation of the compass, and the long axis of said spheroid being perpendicular to said line.

3. The combination with a magnetic compass of a pair of correctors for quadrantal deviation mounted at either side of the compass with their centers substantially on a straight line passing through the center of the compass, said correctors comprising masses of relatively soft ferrous material in the shape of elongated ellipsoids with the elongated axes being substantially perpendicular to said straight line.

4. The combination with a magnetic compass of a pair of correctors for quadrantal deviation mounted at either side of the compass with their centers substantially on a straight line perpendicular to the axis of rotation of the compass card, said correctors comprising masses of relatively soft ferrous material in the shape of ellipsoids of which the longest axes are perpendicular to said line joining their centers and lie in a normally horizontal plane, the longest axis of each ellipsoid being substantially of length three times that of the other normally horizontal axis of the ellipsoid and the length of said other normally horizontal axis being at least as great as that of the normally vertical axis of the ellipsoid.

5. The combination with a magnetic compass of a pair of correctors for quadrantal deviation mounted at either side of the compass with their centers substantially on a straight line perpendicular to the axis of rotation of the compass card, said correctors comprising masses of relatively soft ferrous material in the shape of prolate spheroids of which the long axes are perpendicular to said line joining their centers and lie in a normally horizontal plane, the long axis of each spheroid being substantially of length three times that of the shorter axes thereof.

6. The combination with a magnetic compass of a pair of correctors for quadrantal deviation mounted at either side of the compass with their centers substantially on a straight line perpendicular to the axis of rotation of the compass card, said correctors comprising masses of relatively soft ferrous material in the shape of ellipsoids of which the longest axes are perpendicular to said line joining their centers and lie in a normally horizontal plane, the longest axis of each ellipsoid being substantially of length three times that of the other normally horizontal axis thereof.

EDWARD W. HART.

REFERENCES CITED

The following references are of record in the file of this patent:

FOREIGN PATENTS

| Number | Country | Date |
| --- | --- | --- |
| 344,696 | Great Britain | Mar. 12, 1931 |
| 610,657 | France | June 14, 1926 |